Dec. 26, 1922.
J. A. SNYDER.
TRACTOR GEAR CASING.
FILED AUG. 9, 1921.
1,440,250.
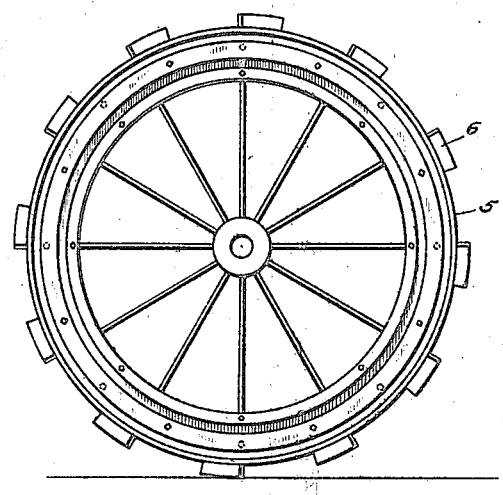
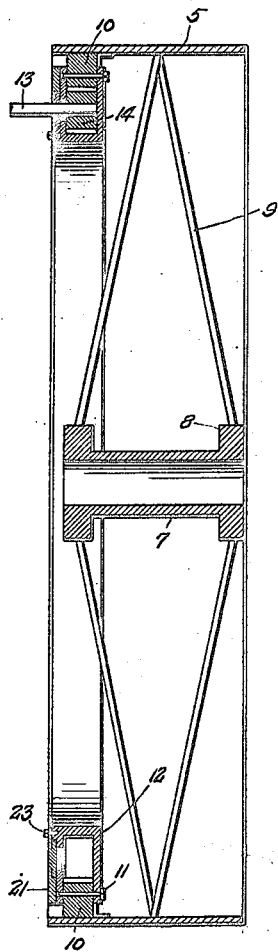
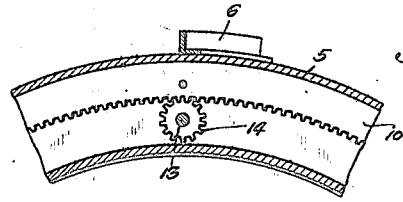
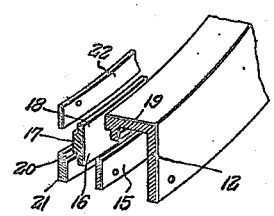
J. A. Snyder, INVENTOR.
BY Geo. P. Kimmel, ATTORNEY.

Patented Dec. 26, 1922.

1,440,250

UNITED STATES PATENT OFFICE.

JAMES A. SNYDER, OF CRARY, NORTH DAKOTA.

TRACTOR GEAR CASING.

Application filed August 9, 1921. Serial No. 490,896.

*To all whom it may concern:*

Be it known that I, JAMES A. SNYDER, a citizen of the United States, residing at Crary, in the county of Ramsey and State of North Dakota, have invented certain new and useful Improvements in Tractor Gear Casings, of which the following is a specification.

This invention relates to a tractor gear casing or housing and more particularly to that class of structures designed to entirely inclose the internal or external gears of tractor wheels.

The primary object of the invention resides in the construction of a dirt and dust proof casing for a tractor wheel gearing wherein the parts are so assembled as to confine a lubricant and prevent the admission of foreign matter thereto which might otherwise affect the efficiency and proper operation of the gears.

Another and very important object of the invention is the provision of a gear housing designed for use and adapted to be installed on practically any type of internal or external truck wheel gearing, and one in which the parts are extremely simple in construction, easily assembled, rigid and durable, highly efficient in operation, practical and capable of being manufactured at a very low cost whereby its commercial possibilities are greatly enhanced.

With these objects in view, and others which will be manifest and suggested as the purpose and nature of my invention are revealed in the following specification and drawing wherein I have shown a preferred embodiment thereof, Figure 1 is a side view of a tractor wheel to which the invention is applied, Fig. 2 is a vertical section therethrough, Fig. 3 is a sectional view showing the gearing, and, Fig. 4 is a detail view of the housing with the gearing removed.

Referring now to the drawings, wherein like parts designate corresponding parts throughout the several views, 5 designates the usual and common type of tractor wheel having any suitable type of tractor cleats 6 on the outer periphery thereof, the said wheel having a hub 7 with inner and outer flanges 8 to which the spokes 9 are attached in any well known manner, all of which is of standard construction.

The internal ring gear 10 which may be formed integral with the wheel 5 or attached thereto by brackets is secured by suitable fastening elements 11 to the longer or vertical arm 12 of the inverted, L-shaped housing designated in its entirety by numeral 12, which of course, rotates with the gear above referred to. The drive shaft 13 and its gear pinion 14 carried thereby is disposed within the L-shaped housing 12 for cooperation with the internal gear 10 in order to drive the same by means of any external source of power in the manner well understood. The fastening element 11 which passes through the vertical arm of the housing 12 and the internal ring gear also retains an annular ring 15 which is held in a bottom recess 16 formed in the ring 17, which as shown is substantially T-shaped in cross section and has its upper groove 18 disposed for cooperation with and snugly fitting the extension 19 of the housing 12. The ring 17 also fits in the groove 20 formed in the outer ring 21 which of course prevents the outward movement and displacement of the ring 17 as clearly shown by Fig. 4 for instance. An inner annular ring 22 also bears against the ring 17 and is secured by suitable fastening elements 23 to the housing 12 to assist and prevent the same T-shaped ring 17 from being displaced. The last mentioned grooved ring 21 does not rotate with the internal gearing and housing attached to the wheel, but is loosely held in the housing and prevents the admission of any foreign matter therein.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described the invention, what I now claim as new and desire to secure by Letters Patent of the U. S. is:—

1. The combination of a rotatable wheel having an internal ring gear and gear pinion, a housing open on one side secured to the ring gear and interfitting rings connecting the open side of the housing with the internal gear for confining said pinion within the housing.

2. The combination of a rotatable wheel having an internal ring gear and gear pinion, a housing open on one side overlying the ring gear, said housing comprising a long and short arm, fastening elements securing the longer arm to one side of the ring gear and interfitting rings connecting the shorter arm of the housing to the other side of the ring gear for confining said pinion within the housing.

3. The combination of a rotatable wheel having an internal ring gear and gear pinion, an L-shaped housing overlying the ring gear, fastening elements securing the longer arms of the housing to the side of the ring gear, an annular ring secured to the opposite side of the ring gear by said fastening elements, an annular connecting ring, T-shaped in cross section disposed between the shorter arm of the housing and the first mentioned annular ring, and outer rings bearing against said T-shaped ring, for retaining the same and confining the pinion within the housing.

In testimony whereof, I affix my signature hereto.

JAMES A. SNYDER.